UNITED STATES PATENT OFFICE.

VICTOR SASS AND KARL FRIEDERICH, OF BERLIN, GERMANY.

SECONDARY BATTERY.

SPECIFICATION forming part of Letters Patent No. 354,352, dated December 14, 1886.

Application filed August 4, 1886. Serial No. 210,003. (No specimens.)

*To all whom it may concern:*

Be it known that we, VICTOR SASS and KARL FRIEDERICH, of Berlin, Germany, have invented a new and Improved Method for the Manufacture of Electrodes for Accumulators and Secondary Batteries, of which the following is a full, clear, and exact description.

The object of our invention is to provide a new and improved method for manufacturing very effective electrodes for accumulators or secondary batteries.

The invention consists of melting lead and zinc in equal parts, and heating this composition until oxidation of the lead sets in, and then dissolving the zinc by means of dilute sulphuric acid.

According to our improved method we first melt lead and zinc together in equal parts, and then heat this composition under constant agitation of the same until a uniform pliable mass is produced. By the process of heating the composition of zinc and lead the latter is fully oxidized, and then the entire mass in its heated state is rolled by means of heated rollers into plates of the desired shape and form. After the plates have cooled the necessary carbon conductors are secured to the plates, and the latter are then placed for a few days in dilute sulphuric acid. The latter dissolves the zinc entirely, and only the lead oxide remains in a well-divided state, so as to be specially effective for receiving and discharging the current of electricity which passes through the above-mentioned carbon conductors. The plates thus formed and prepared are now employed in the usual manner as electrodes for accumulators and secondary batteries. The strength of the electrodes or plates can be changed by increasing or diminishing the quantity of zinc.

Having thus described our invention, what we claim as new, and desire to secure by Letters Patent, is—

The herein-described method for manufacturing electrodes for accumulators and secondary batteries, consisting of heating the zinc and lead together in equal parts, and then heating this composition until a complete oxidation of the lead sets in, after which the heated pliable mass is formed into plates, from which the zinc is dissolved by the use of dilute sulphuric acid, substantially as shown and described.

In testimony whereof we have hereunto set our hands in presence of two subscribing witnesses.

VICTOR SASS.
KARL FRIEDERICH.

Witnesses:
W. PERCY TILGHMAN,
M. W. MOORE.